United States Patent
Olien

(10) Patent No.: US 9,684,375 B2
(45) Date of Patent: Jun. 20, 2017

(54) SYSTEMS AND METHODS FOR STABILIZING A HAPTIC TOUCH PANEL OR TOUCH SURFACE

(75) Inventor: Neil T. Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 1263 days.

(21) Appl. No.: 12/334,189

(22) Filed: Dec. 12, 2008

(65) Prior Publication Data

US 2010/0149111 A1 Jun. 17, 2010

(51) Int. Cl.
G06F 3/01 (2006.01)
G06F 3/041 (2006.01)
G06F 3/0354 (2013.01)

(52) U.S. Cl.
CPC .......... *G06F 3/016* (2013.01); *G06F 3/03547* (2013.01); *G06F 3/041* (2013.01)

(58) Field of Classification Search
CPC ....... G06F 3/016; G06F 3/03547; G06F 3/041
USPC .................................................. 345/173–178
See application file for complete search history.

(56) References Cited

U.S. PATENT DOCUMENTS

| | | | |
|---|---|---|---|
| 6,636,419 B2 * | 10/2003 | Duarte | 361/679.09 |
| 2002/0077161 A1 | 6/2002 | Eromaki | |
| 2003/0030971 A1 | 2/2003 | Duarte | |
| 2004/0164971 A1 * | 8/2004 | Hayward et al. | 345/179 |
| 2008/0024440 A1 | 1/2008 | Olien et al. | |
| 2008/0024463 A1 | 1/2008 | Pryor | |
| 2008/0042986 A1 | 2/2008 | Westerman et al. | |
| 2008/0143693 A1 | 6/2008 | Schena | |
| 2008/0303782 A1 | 12/2008 | Grant et al. | |

FOREIGN PATENT DOCUMENTS

| | | |
|---|---|---|
| JP | H 09167541 | 6/1997 |
| JP | 2004-235687 | 8/2004 |
| JP | 2006-325323 | 11/2006 |
| JP | 2008-282125 | 11/2008 |

OTHER PUBLICATIONS

International Search Report and Written Opinion mailed Jan. 20, 2010 for corresponding PCT Patent Application No. PCT/US2009/066516.
Japanese Patent Office, Notice of Reasons for Rejection, Application No. 2011-540784, dated Sep. 10, 2013.
Japanese Patent Office, Notice of Reasons for Rejection, Application No. 2014-250971, dated Dec. 8, 2015.

* cited by examiner

*Primary Examiner* — David Tung
(74) *Attorney, Agent, or Firm* — Kilpatrick Townsend & Stockton LLP

(57) ABSTRACT

Systems and methods for stabilizing haptic touch panels or touch surfaces are disclosed. For example, one disclosed system includes a housing having a base; and a touch sensitive input device. The apparatus further includes a first support member coupled to the base via a first hinge and coupled to the touch sensitive input device via a second hinge; a second support member coupled to the base via a third hinge and coupled to the touch sensitive input device via a fourth hinge; wherein the first support member and the second support member are configured to facilitate movement of the touch sensitive input device in a first degree of freedom.

10 Claims, 6 Drawing Sheets

SYSTEMS AND METHODS FOR STABILIZING A HAPTIC TOUCH PANEL OR TOUCH SURFACE

FIELD OF THE INVENTION

The present invention generally relates to touch surfaces, and more specifically relates to systems and methods for stabilizing haptic touch panels or touch surfaces.

BACKGROUND

Conventionally touch panels with haptic feedback are stabilized by multiple actuators. One example of a conventional haptic device with a touch panel comprises a touch panel with four actuators mounted underneath to provide effective stabilization and haptic effects. Because multiple actuators are used for support, the cost, size, and weight of the conventional haptic device is increased. Thus, a need exists for systems and methods for stabilizing haptic touch panels or touch surfaces.

SUMMARY

Embodiments of the present invention provide systems and methods for stabilizing a haptic touch panel or touch surface. In one embodiment, a system for stabilizing a haptic touch panel comprises a housing having a base, and a touch sensitive input device. Additionally, the system comprises a first support member coupled to the base via a first hinge and coupled to the touch sensitive input device via a second hinge, and a second support member coupled to the base via a third hinge and coupled to the touch sensitive input device via a fourth hinge, the second support member, wherein the first hinge, the second hinge, the third hinge, and the fourth hinge are configured to facilitate movement of the touch sensitive input device in a first degree of freedom.

In another embodiment, a system for stabilizing a haptic touch panel comprises a housing, a touch sensitive input device, a first support member and a second support member. The first support member is coupled to the base via a first flexure and coupled to the touch sensitive input device via a second flexure, and the second support member is coupled to the base via a third flexure and coupled to the touch sensitive input device via a fourth flexure, the first flexure, second flexure, third flexure, and fourth flexure configured to facilitate movement of the touch sensitive input device in a first degree of freedom.

These illustrative embodiments are mentioned not to limit or define the invention, but to provide two examples to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention comprise systems and methods for stabilizing a haptic touch panel or touch surface. Systems according to the present invention may be embodied in a number of ways. Certain embodiments of the present invention may, for example, facilitate lateral movement of a touch panel through two hinged support members positioned opposite each other.

Example of a System to Stabilize a Haptic Touch Panel or Touch Surface

In one illustrative embodiment of the present invention, a system such as a car stereo comprises a touch sensitive input device, such as a touch panel. The housing of the car stereo system includes a base, which is mounted on the console or storage compartment. The touch panel is suspended above the base of the housing by two support members positioned opposite each other. The first support member is coupled to the base of the housing via a first hinge, and coupled to the touch panel via a second hinge. The second support member is coupled to the base of the housing via a third hinge, and coupled to the touch panel via a fourth hinge.

The first hinge, the second hinge, the third hinge, and the fourth hinge are configured to facilitate movement of the touch panel in a first degree of freedom, such as in a lateral, left-to-right or side-to-side direction. In one variation, the first hinge and the second hinge are aligned with each other, and positioned directly opposite an alignment of the third hinge and the fourth hinge. By aligning the axis of each hinge, and positioning the first hinge and the second hinge opposite the third hinge and the fourth hinge, the touch panel may be moved by the support members in a lateral or side-to-side direction.

In another variation, the first support member is coupled to the base of the housing via a first flexure and coupled to the touch sensitive input device via a second flexure. Likewise, the second support member is coupled to the base via a third flexure and coupled to the touch sensitive input device via a fourth flexure. In such a variation, the first flexure, the second flexure, the third flexure, and the fourth flexure are configured to facilitate movement of the touch sensitive input device. In one variation, each flexure is configured to support movement of a support member in a lateral direction, while resisting movement of a support member in other directions. By aligning each flexure, the touch panel may be moved by the support members in a lateral direction, while resisting movement in other directions.

This example is given to introduce the reader to the general subject matter discussed herein. The disclosure is not limited to this example. Further details regarding various embodiments for stabilizing a haptic touch panel or touch surface are described below.

Figure 1A:
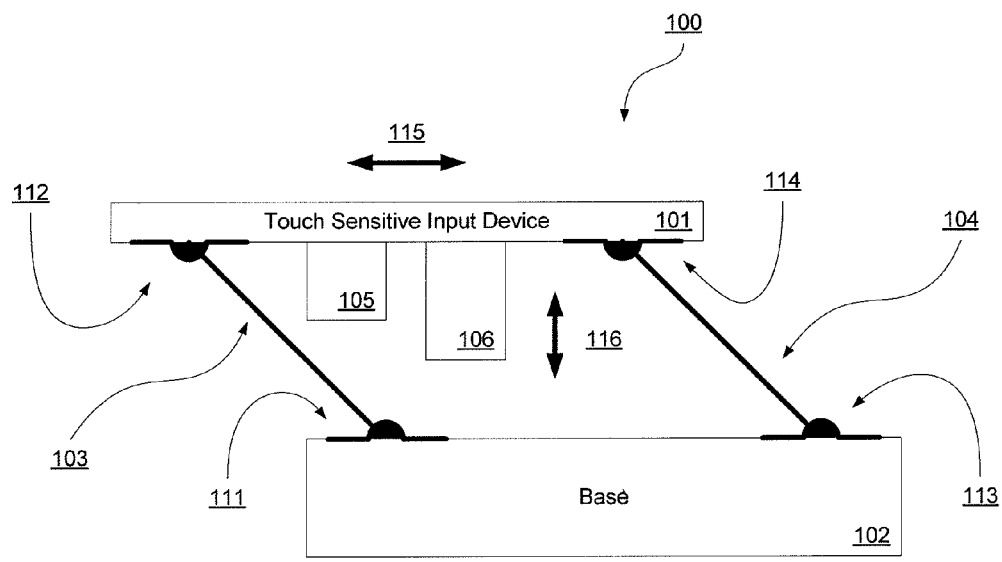
FIGS. 1A and 1B are illustrations of a first state and a second state of a system to stabilize a haptic touch panel or touch surface according to one embodiment.
Figure 1B:
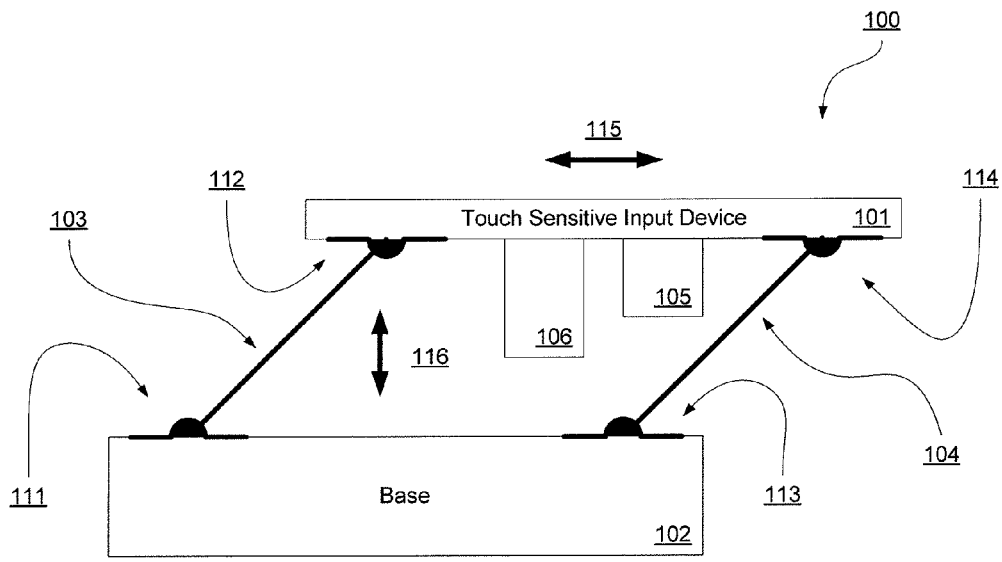

Illustrative Embodiments of a System to Stabilize a Haptic Touch Panel or Touch Surface Referring now to the drawings in which like numerals indicate like elements throughout the several figures, FIGS. 1A and 1B are illustrations of a first state and a second state of a system to stabilize a haptic touch panel or touch surface according to one embodiment. Other embodiments may be utilized.

As shown in FIG. 1A, the system 100 comprises a touch sensitive input device 101. The touch sensitive input device 101 may comprise a touch panel or touch surface. The touch panel or touch surface may be a part of a portable device, such as a mobile or cellular telephone, navigational Global Positioning System (GPS) receiver, portable video game device, or portable media player. In other variations, the touch panel or touch surface may be integrated into a permanent or semi-permanent device, such as a mounted or in-dash navigational unit, a car stereo, a wall panel, a dishwasher panel, a washer or dryer panel, a desktop phone, a door panel, or a microwave panel. The touch sensitive input device may be substantially rigid—that is, not subject to substantial deforming when touched or contacted under normal use.

One or more actuators 105 may be coupled to the touch sensitive input device 101. In one embodiment, a first actuator 105 is coupled to the base 102 and a second actuator 105 is coupled to the touch sensitive input device 101. In another embodiment, one or more actuators 105 may only be coupled to the touch-sensitive input device 101. The actuator 105 can be configured to provide haptic feedback to the touch surface. In one variation, one or more actuators 105 may be in communication with the touch-sensitive input device through a connecting mechanism.

The actuator 105 may be an electric motor, an electromagnetic actuator, a voice coil, a linear resonant actuator, a shape memory alloy, an electro-active polymer, a solenoid, an eccentric rotating mass motor (ERM) or a linear resonant actuator (LRA). The actuator 105 may be configured to produce a haptic feedback effect in synchronization with or in response to a signal received from an input device and/or sensor. A mechanical or electrical sensor (not shown in FIG. 1) may detect when the touch sensitive input device 101 has been touched or activated, and respond by sending a signal to the actuator 105. Alternatively, the touch sensitive input device may generate a signal based at least in part on the use or activation of the input device. The system 100 may additionally comprise a processor 106. The processor 106 may receive signals from the touch sensitive input device 101 and transmit signals to the actuator 105.

The system 100 further comprises a first support member 103 and a second support member 104. Although two support members are illustrated in FIG. 1A, other variations may comprise one support member, or multiple support members (three or more support members).

The first support member 103 and the second support member 104 may comprise a rigid or semi-rigid material, such as plastic. Together, the support members 103, 104 are the primary support members of the touch sensitive input device 101. The support members 103, 104 may also support the weight of the actuator 105, and the processor 106, such that the touch sensitive input device 101, the actuator 105, and the processor 106 are suspended above the base 102. Accordingly, in the embodiment shown in FIG. 1A, the actuator 105 does not bear the load of the touch sensitive input device 101. Rather, the first support member 103 and the second support member 103 support the touch sensitive input device above the base 102.

Because the support members 103, 104 provide structural support to suspend the touch sensitive input device 101 above the base 102, the device may not utilize any actuators 105 for structural support. Thus, actuator(s) 105 configured to provide haptic feedback to the touch sensitive input device may be smaller and/or more efficient.

The support members 103, 104 may be positioned opposite each other. In one variation, the first support member 103 is positioned on one end of the touch sensitive input device 101, and the second support member is positioned on an opposite end of the touch sensitive input device 101. In another variation, as illustrated in FIG. 1A, the support members 103, 104 are positioned opposite each other and within the area defined by the touch sensitive input device 101.

As shown in FIG. 1A, the first support member 103 is coupled to the base 102 via a first hinge 111, and coupled to the touch sensitive input device 101 via a second hinge 112. Similarly, support member 104 is coupled to the base 102 via a third hinge 113, and coupled to the touch-sensitive input device 101 via a fourth hinge 114. Hinges 112 and 114 may be positioned below the touch sensitive input device 101 as shown in FIG. 1A, or alternatively at the edges of the touch sensitive input device 101.

The first hinge 111, the second hinge 112, the third hinge 113, and the fourth hinge 114 are configured to facilitate movement of the touch panel in a first degree of freedom, such as in a lateral or side-to-side direction indicated by the arrow 115. In FIG. 1A, the first hinge 111 and the second hinge 112 are aligned to facilitate movement of the first support member 103. By aligning the first hinge 111 and the second hinge 112, the first support member 103 can move in the first degree of freedom 115 by pivoting about the axis of the first hinge 111 and about the axis of the second hinge 112.

In a similar manner, the third hinge 113 and the fourth hinge 114 can be aligned to facilitate movement of the second support member 104 in the first degree of freedom 115. By aligning the third hinge 113 and the fourth hinge 114, the second support member 104 can move laterally in the first degree of freedom 115 by pivoting about the axis of the third hinge 113 and about the fourth hinge 114.

By properly orienting, or aligning, the first axis, the second axis, the third axis, and the fourth axis, the first support member 103 and the second support member 104 may move in the same lateral degree of freedom 115. Because the first support member 103 and the second support member 104 are both coupled to the base 102 and the touch sensitive input device 101, support members 103, 104 may move together, in unison, moving the touch sensitive input device 101 in the lateral degree of freedom 115. Opposite support members 103, 104 may be the same, or substantially similar length, in order for the touch sensitive input device 101 to maintain the same orientation. In FIG. 1A, the touch sensitive input device 101 is shown displaced in a left lateral direction. In FIG. 1B, the touch sensitive input device 101 is shown displaced in a right lateral direction.

The support members 103, 104 and the hinges 111, 112, 113, 114 may be configured to allow motion in one direction, while substantially preventing displacement or motion in other directions. While the touch panel or touch surface is being displaced in a lateral or side-to-side degree of freedom 115, there may be little displacement in other degrees of freedom. In one embodiment, the arc of the lateral displacement may be small, such that the touch surface is not substantially displaced in the orthogonal direction 116. As an example, a touch surface measuring 100 millimeters by 60 millimeters may oscillate laterally by 0.5 millimeters from the center position. Such a small displacement in the lateral direction 115 may correspond with a small arc of displacement, translating into an imperceptible displacement in the orthogonal direction 116 towards or away from the user. In another variation, the length of the hinges or support members 103, 104 may be similar to the length of the spring element of the actuator 105, which may leave little room for displacement of the input device 101 in the orthogonal direction.

In one variation, the support members 103, 104 comprise a rigid, substantially non-compliant material, such as plastic or metal. Rigid support members 103, 104 may resist compression or movement in various degrees of freedom orthogonal or perpendicular to a lateral degree of freedom 115.

As an example, an actuator may provide haptic feedback, such as a lateral vibration, to a touch panel. In response, the first and second support member may displace the touch panel in a side-to-side, or lateral, direction. At the same time, the touch panel may not move in an up-and-down, or vertical direction. The position and alignment of the first hinge and the third hinge, and the position and alignment of the second hinge and the fourth hinge, may facilitate the movement or displacement in a single degree of freedom.

Figure 2:
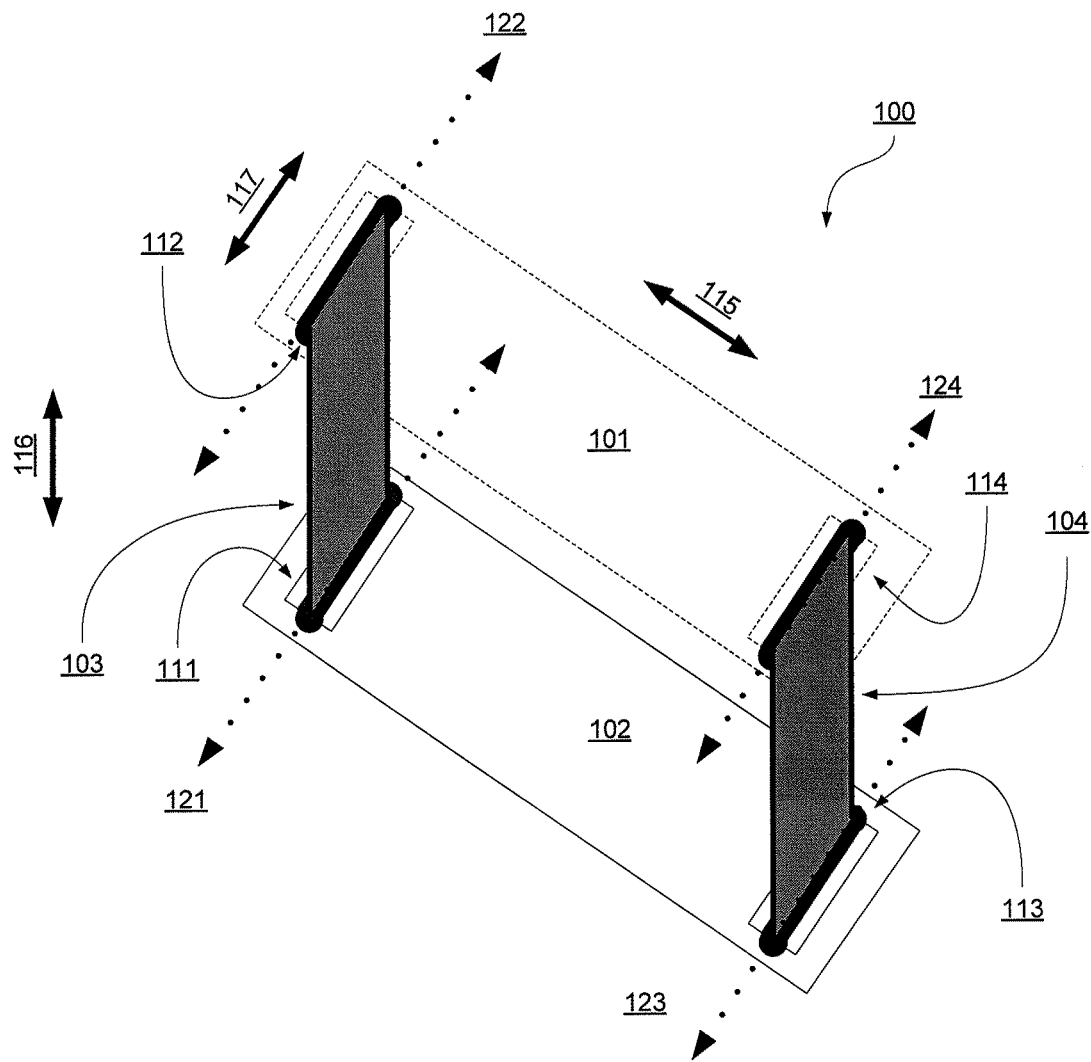
FIG. 2 is an illustration of a third state of a system to stabilize a haptic touch panel or touch surface according to one embodiment.

FIG. 2 is an illustration of a third state of a system to stabilize a haptic touch panel or touch surface according to one embodiment. The elements of this system are described with reference to the system depicted in FIGS. 1A and 1B. A variety of other implementations are also possible.

As shown in FIG. 2, the first support member 103 is positioned substantially opposite the second support member 104. Likewise, the first pair of hinges 111, 112 is positioned substantially opposite the second pair of hinges 113, 114. Each hinge 111, 112, 113, 114 is positioned about an axis. The first hinge 111 is positioned about a first axis 121, the second hinge 112 is positioned about a second axis 122, the third hinge 113 is positioned about a third axis 123, and the fourth hinge 114 is positioned about a fourth, axis 124.

By aligning a pair of axes, the corresponding pair of hinges may support movement in a degree of freedom. As illustrated in FIG. 2, the first hinge 111 and the second hinge 112 are aligned such that axis 121 is parallel to axis 122. By aligning each axis 121, 122, the first support member 103 may pivot about each hinge 111, 112, and move in a lateral direction 115.

By aligning each axis 121, 122, 123, 124, each support member 103, 104 may move in a uniform manner, causing the touch sensitive input device 101 to move in a lateral degree of freedom 115.

Figure 3:
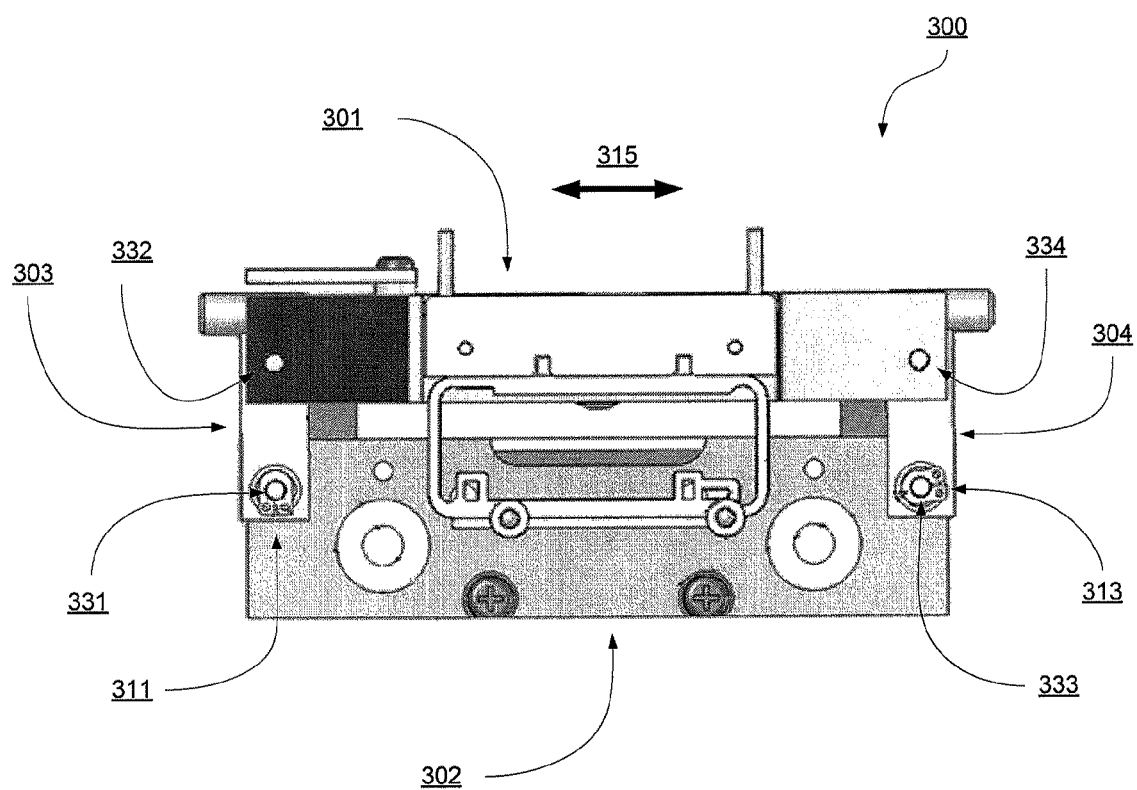
FIG. 3 is a diagram illustrating a second system to stabilize a haptic touch panel or touch surface according to one embodiment.

Various systems in accordance with the present invention may be constructed. FIG. 3 is a diagram illustrating a second system to stabilize a haptic touch panel or touch surface according to one embodiment.

In the embodiment shown, a touch panel 301 is supported above a base 302 of a housing via a first support member 303 and a second support member 304. The first support member 303 is coupled to the base 302 via a first pinned hinge 311, and coupled to the touch panel 301 via a second pinned hinge (not shown in FIG. 3). A first hinge pin 331 anchors, or holds in place, the coupling of the first support member 303 with the first pinned hinge 311, and a second hinge pin 332 anchors the coupling of the first support member 303 with the second pinned hinge. The second support member 304 is coupled to the base 302 via a third pinned hinge 313, and coupled to the touch panel via a fourth pinned hinge (not shown in FIG. 3). A third hinge pin 333 anchors the coupling of the second support member 304 with the third pinned hinge 313, and a fourth hinge pin 334 anchors the coupling of the second support member 304 with the fourth pinned hinge.

The axis of each pinned hinge travels through the hinge pin of each pinned hinge. For example, the axis of the first pinned hinge travels alongside the first hinge pin 331. By aligning each hinge pin 331, 332, 333, and 334, the axis of each hinge is aligned. In such an arrangement, the support members 303, 304 pivot about the axis of each hinge in unison, moving the touch panel 301 along the lateral degree of freedom 315. By using a set of double hinges, lateral motion may be facilitated, while rigidity of the support members impedes motion in other degrees of freedom. The set of double hinges may also facilitate lateral motion with relatively little displacement in an outward/inward degree of freedom.

The range of motion of the touch panel 301 across the lateral degree of freedom 315 may be limited. By limiting the lateral range of motion, the touch panel 301 may remain substantially fixed in a vertical degree of freedom.

Other embodiments may utilize other methods of coupling the support members to the touch panel and the housing. For example, each support member may be coupled to the base and to the touch sensitive input device via a flexible coupling, or a flexure. The flexible coupling may tolerate motion in a lateral degree of freedom, while inhibiting motion in one or more other degrees of freedom. In one embodiment, the flexible coupling comprises a rubber coupling, tolerant of movement in a degree of freedom. In another embodiment, the flexible coupling comprises a material configured to be deformed or flex in one degree of freedom, such as a living hinge comprising a polyethylene or polypropylene material.

Figure 4:
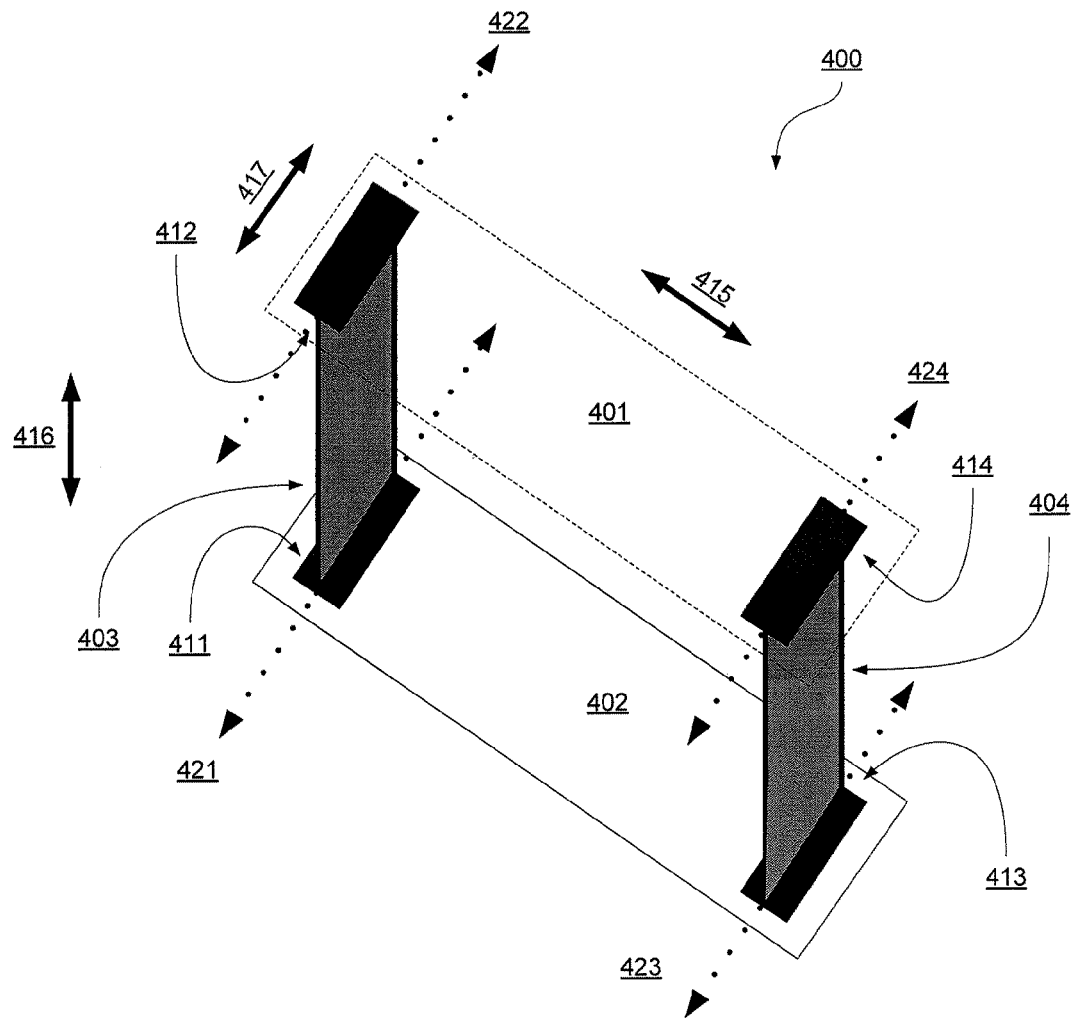
FIG. 4 is a diagram illustrating a third system to stabilize a haptic touch panel or touch surface according to one embodiment.

FIG. 4 is diagram illustrating a third system to stabilize a haptic touch panel or touch surface according to one embodiment. As shown in FIG. 4, the system 400 comprises a touch sensitive input device 401. The touch sensitive input device 401 is suspended above a base 402 by a first support member 403 and a second support member 404. One or more actuators (not shown in FIG. 4) may be coupled to the touch sensitive input device, and configured to provide haptic feedback. Additionally, a processor (not shown in FIG. 4) may be coupled to the touch sensitive device 401 and configured to receive input signals from the touch sensitive input device 401.

The first support member 403 is coupled to the base 402 via a first flexure 411, and coupled to the touch sensitive input device 401 via a second flexure 412. Likewise, the second support member is coupled to the base 402 via a third flexure 413, and coupled to the touch sensitive input device 401 via a fourth flexure 414. The first flexure 411, the second flexure 412, the third flexure 413, and the fourth flexure 414 are configured to facilitate movement of the touch sensitive input device 401 in a first degree of freedom 415. For example, the flexures may comprise a plastic or rubber material configured to flex or move about their axes. In one variation, the support members 403, 404 may be configured to flex over its entire length to support lateral movement of the touch sensitive input device.

While each flexure 411, 412, 413, 414, may facilitate lateral movement of the touch sensitive input device 401, each flexure and each support member 403, 404 may retard or impede movement in other degrees of freedom 416, 417. For example, as the first support member 403 bends laterally, it may remain rigid in a vertical degree of freedom 417. Further, by limiting the arc of the lateral movement of the touch sensitive input device 401, for example, based on separation of the support members 403, 404, the movement of the touch sensitive device along a third degree of freedom 416 may be limited or negligible. Negligible movements along the third degree of freedom 416 may be imperceptible as the touch sensitive input device moves along the lateral degree of freedom 415.

Figure 5:
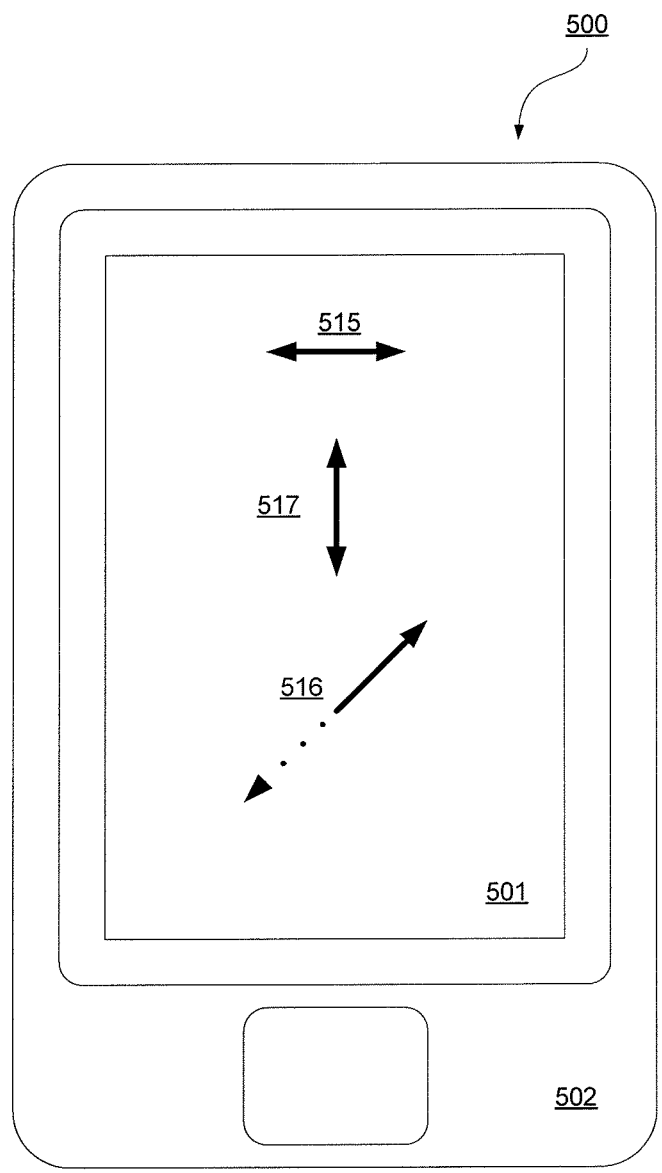
FIG. 5 is a diagram illustrating a fourth system to stabilize a haptic touch panel or touch surface according to one embodiment.

FIG. 5 is a diagram illustrating a third embodiment of the present invention. FIG. 5 illustrates a mobile phone device 500. The mobile phone device 500 comprises a touch sensitive input device, such as a touch screen 501, and a device housing 502. The device housing 502 may further comprise a base (not shown in FIG. 5). The base may provide a platform for support members (not shown in FIG. 5) to support the touch screen 501.

The touch screen 501 can be configured to accept input through the detection of contacts or touching within the area of the panel. The touch screen 501 may comprise a multi-touch device, configured to accept input by detecting simultaneous multiple contacts on the surface of the touch screen 501. A processor (not shown in FIG. 5) may be configured to receive input signals from the touch screen 501, and output signals to the touch screen 501, to an actuator (not shown in FIG. 5), or to other devices.

The touch screen 501 be supported by a pair of support members positioned underneath, behind, or below the touch screen 501. Each support member may be coupled to the touch screen 501 and to the housing 502 through a supporting means such as a hinge or a flexure. In one variation, a single support member is positioned underneath the touch screen 501 to suspend the touch panel above the housing 502. In other variations, three or more support members support the touch screen 501 above the housing 502.

The touch screen 501 may be configured to move in a lateral degree of freedom indicated by 515. By aligning the axis of each hinge coupling the support member to the housing 502 and to the touch screen 501, the support member may move in a lateral or side-to-side direction 515. In one variation, each flexure coupling the support member to the housing 502 and to the touch screen 501 is aligned, facilitating movement of the support member in the lateral direction 515. As the support member pivots about the hinges or flexures, the touch screen 501 moves in a lateral direction. The range of motion of the touch screen 501 in the lateral direction 515 may be limited, to limit or eliminate movement of the touch screen in an outward or inward degree of freedom 516.

While the touch screen 501 may be configured to move in a lateral direction 515, movement of the touch panel in other directions, such as indicated by 517, may be impeded. In one variation, each hinge coupling the support member to the housing 502 and to the touch screen 501 may only be configured to support lateral direction.

Figure 6:
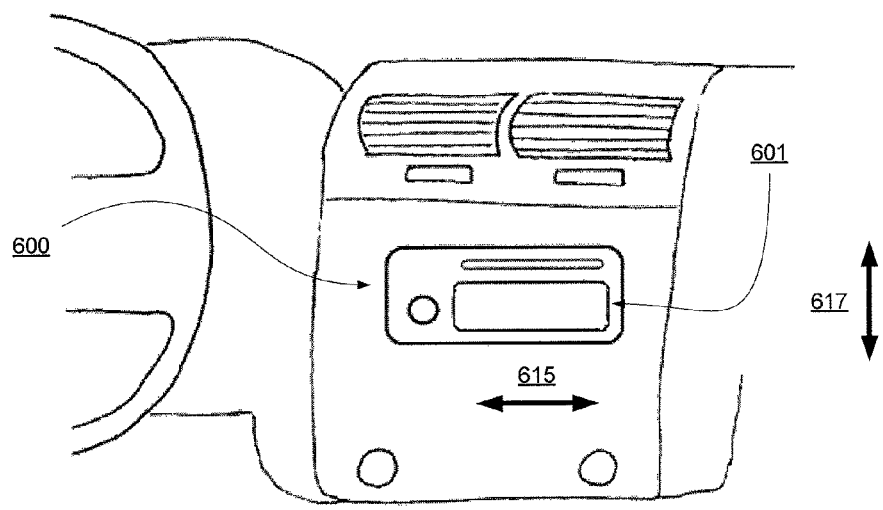
FIG. 6 is a diagram illustrating a fifth system to stabilize a haptic touch panel or touch surface according to one embodiment.

FIG. 6 is a diagram illustrating a seventh system to stabilize a haptic touch panel or touch surface according to one embodiment. FIG. 6 illustrates an in-dash GPS unit 600 including a touch surface 601. The touch surface 601 may be configured to move laterally 615, or side-to-side, without moving vertically 617. Additionally, the support members and the coupling apparatus may be configured to inhibit movement of the touch screen out of or into the device as the touch screen moves laterally.

Figure 7:
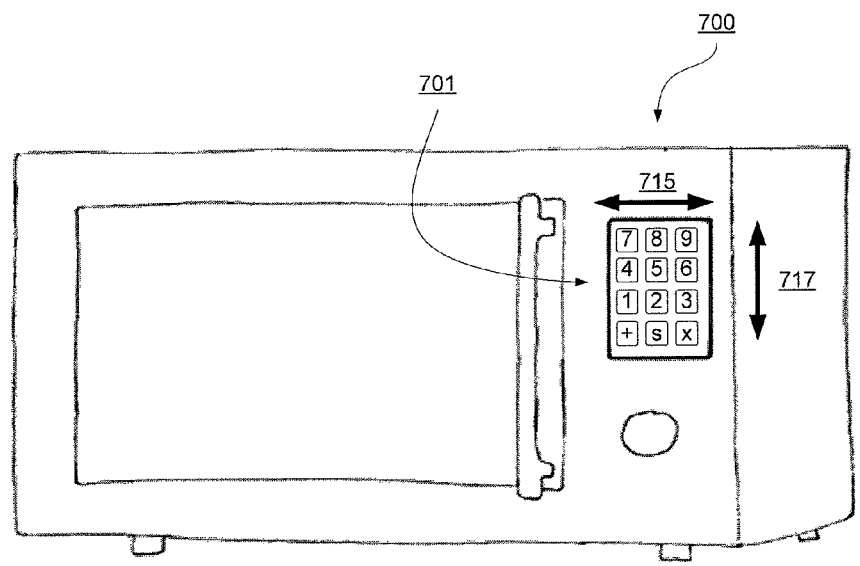
FIG. 7 is a diagram illustrating a sixth system to stabilize a haptic touch panel or touch surface according to one embodiment.

FIG. 7 is a diagram illustrating a sixth system to stabilize a haptic touch panel or touch surface according to one embodiment. FIG. 7 illustrates a microwave including a touch screen. The touch screen may be configured to move laterally 715, or side-to-side, without moving up or down 717, or flexing towards or away a user. In another embodiment, the touch screen may be configured to move vertically 717, without being displaced laterally 715.

One embodiment of a system for stabilizing haptic touch panels or touch screen is configured to facilitate movement of a touch-sensitive input device in a first degree of freedom, without any structural support provided by actuators coupled to the touch sensitive input device. Because a different bearing system to limit the motion of the touch panel is used, the actuator itself does not need to be rigid in these degrees of freedom. A significant benefit of embodiments for stabilizing haptic touch panels or touch screens is that fewer actuators may be used in a device, yielding greater design freedom. For instance, the design of the actuator may not need to take into account how the touch sensitive input device will be loaded or used.

Additionally, because the touch sensitive input device is supported by an apparatus independent of the actuator(s), the actuator(s) need not be designed for structural support. Freeing the actuator(s) of this requirement may reduce the size, weight, and complexity of the device, resulting in smaller, more economical, and more reliable haptic devices.

Systems and methods for stabilizing haptic touch panels or touch screen may be more robust to failure. Since systems may not rely on the actuator for structural support, less pressure is put on the actuator, reducing the probability of actuator failure. Further, if an actuator fails, its failure may have a reduced affect on the overall system. For example, when an actuator fails, haptic effects may get weaken or stop, but the touch panel will still be held in place properly.

Limiting motion in a second or third degree of freedom may also add stability to the system. The use of two double hinges which are similar in length to the length of the spring element in the actuator creates a system that is free to move in the direction of the actuator but substantially more rigid in the other directions.

In addition, the touch screen or touch surface of the haptic feedback device may be more stable. The stabilizing apparatus may facilitate movement in one degree of freedom, while inhibiting movement in other degrees of freedom.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof may be apparent to those skilled in the art without departing.

That which is claimed:

1. A system, comprising:
   a housing having a base;
   a touch sensitive input device having a width;
   a first support member coupled to the base via a first hinge and coupled to the touch sensitive input device via a second hinge;
   a second support member coupled to the base via a third hinge and coupled to the touch sensitive input device via a fourth hinge;
   wherein the first, second, third, and fourth hinge each have a length extending substantially the width of the touch sensitive input device;
   wherein the first support member extends substantially across the length of the first hinge and the second hinge and wherein the second support member extends substantially along the length of the third hinge and the fourth hinge;
   wherein the first support member and the second support member are configured to facilitate movement of the touch sensitive input device in a first degree of freedom, and wherein the first support member and the second support member comprise a rigid material; and
   an actuator coupled to the touch sensitive input device, the actuator configured to provide haptic feedback.

2. The system of claim 1, wherein the actuator comprises an electric motor, an electro-magnetic actuator, a voice coil, a linear resonant actuator, a shape memory alloy, or an electro-active polymer.

3. The system of claim 1, wherein the actuator does not bear the load of the touch sensitive input device.

4. The system of claim 1, wherein the first support member is positioned substantially opposite the second support member.

5. The system of claim 1, wherein the first hinge comprises a first pin anchoring the first support member to the first hinge; and
   the second hinge comprises a second pin anchoring the first support member to the second hinge.

6. The system of claim 1, wherein the touch sensitive input device is a touch panel.

7. The system of claim 1, wherein the touch sensitive input device is substantially rigid.

8. The system of claim 1, wherein the touch sensitive input device is configured to move in a lateral degree of freedom.

9. A system, comprising:
   a housing having a base;
   a touch sensitive input device having a width;
   a first support member coupled to the base via a first hinge and coupled to the touch sensitive input device via a second hinge;
   a second support member coupled to the base via a third hinge and coupled to the touch sensitive input device via a fourth hinge;
   wherein the first, second, third, and fourth hinge each have a length extending substantially the width of the touch sensitive input device;
   wherein the first support member extends substantially across the length of the first hinge and the second hinge and wherein the second support member extends substantially along the length of the third hinge and the fourth hinge;
   wherein the first support member and the second support member are configured to facilitate movement of the touch sensitive input device in a first degree of freedom, and wherein the first support member and the second support member comprise a rigid material; and
   an actuator coupled to the touch sensitive input device, the actuator configured to provide haptic feedback.

10. A system configured to stabilize a touch panel, the system comprising:
    a housing having a base, the touch panel positioned above the base and having a width;
    a processor in communication with the touch panel and configured to receive input signals from the touch panel;
    an actuator coupled to the touch panel, and configured to provide haptic feedback to the touch panel, the actuator in communication with the processor and configured to receive vibration signals from the processor;
    a first support member coupled to the base via a first hinge and coupled to the touch panel via a second hinge;
    a second support member coupled to the base via a third hinge and coupled to the touch panel via a fourth hinge, the second support member positioned substantially opposite to the first support member; and
    wherein the first, second, third, and fourth hinge each have a length extending substantially the width of the touch panel;
    wherein the first support member extends substantially across the length of the first hinge and the second hinge and wherein the second support member extends substantially along the length of the third hinge and the fourth hinge;
    wherein the first support member and the second support member are configured to suspend the touch panel above the housing, and wherein the first support member and the second support member are configured to support movement of the touch panel in a lateral degree of freedom, and wherein the first support member and the second support member comprise a rigid material.

* * * * *